Dec. 2, 1958    J. H. WIGHAM    2,862,345
FALLEN PLANT PICK-UP ATTACHMENT FOR COMBINES
Filed July 12, 1956    2 Sheets-Sheet 1
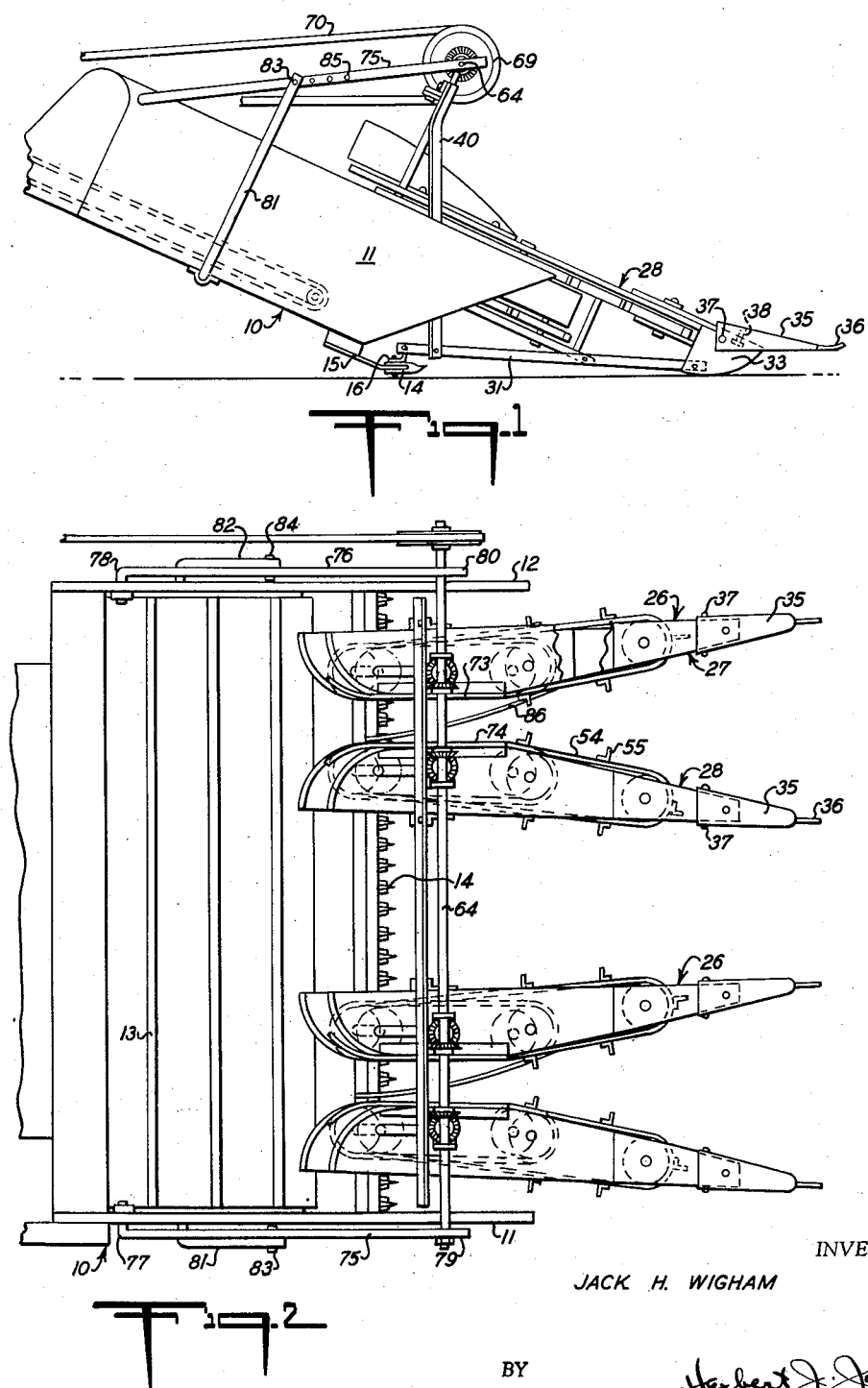
INVENTOR
JACK H. WIGHAM
BY
ATTORNEY

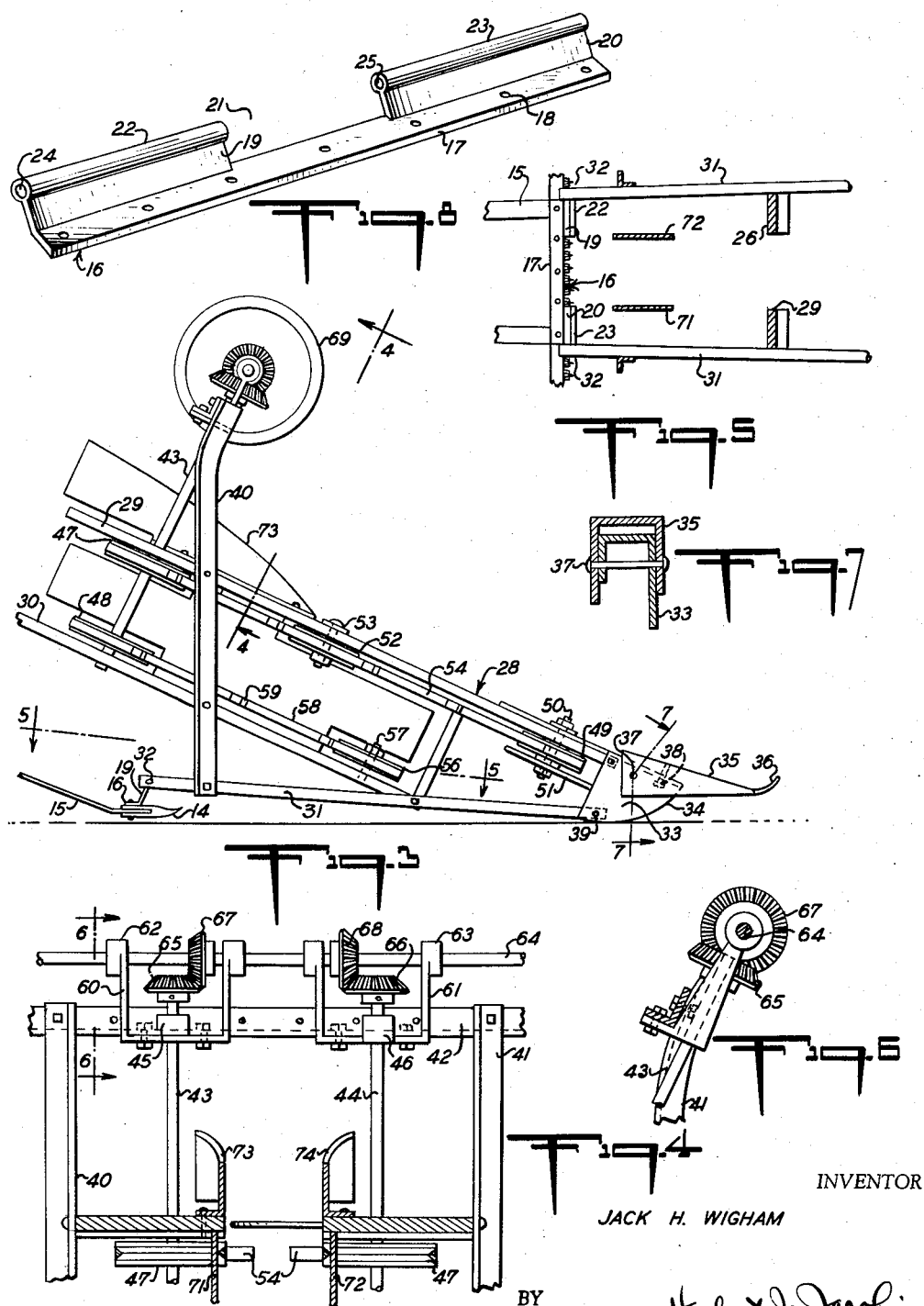

United States Patent Office 2,862,345
Patented Dec. 2, 1958

2,862,345

FALLEN PLANT PICK-UP ATTACHMENT FOR COMBINES

Jack H. Wigham, Amarillo, Tex.

Application July 12, 1956, Serial No. 597,482

3 Claims. (Cl. 56—98)

This invention relates to agriculture and more particularly to harvesting combines incorporating an attachment for facilitating the harvesting of grain or other plants which have fallen over or have been beaten down by wind or rain. The combine attachment comprising this invention represents an improvement on the invention disclosed and claimed in my prior Patent #2,737,770, issued March 13, 1956.

While the combine attachment disclosed and claimed in my prior patent operates satisfactorily when harvesting relatively tall crops, it has been found that when adjusting the combine to harvest relatively short crops, that difficulty has been experienced due to the close proximity to the ground of the cutter bar and the depending angular flange for supporting the combine attachment of the invention, which during movement of the combine over the ground, frequently become clogged with sticks, stones, plants or other foreign material necessitating frequent stoppage for cleaning of the same. It was, therefore, considered necessary to make an improvement on the invention which would permit operation of the combine attachment for harvesting both tall and short crops and which would operate effectively regardless of the presence of foreign material on the ground.

As is well known, relatively great losses are occasioned in connection with the production of grain crops, such as wheat, grain sorghums and the like, as a result of the plants falling over or being beaten over or being beaten down by wind or rain, so that when a conventional harvester or combine passes over the field a large percentage of the fallen plants are passed over and not harvested. These plants, of course, represent a loss to the farmer and consequently, any improvement in combines which would result in harvesting these previously unharvested plants would represent a material step forward in the art. It is also imperative for such an improvement to be effective, that the same operate equally effectively with both tall and short crops.

It is accordingly an object of the invention to provide an attachment for combines which may be substituted for the conventional reel provided on such combines and which will operate to raise plants which have fallen over or have been beaten down and feed the same into the combine to be harvested and treated thereby, the attachment furthermore being so constructed as to permit efficient operation thereof with either tall or short crops.

A further object of the invention is the provision of an attachment for combines to facilitate the harvesting of fallen or beaten down plants, which attachment may be conveniently applied to conventional combines without necessitating changes or modification thereof.

A still further object of the invention is the provision of an attachment for combines to facilitate harvesting of fallen or beaten down plants, which attachment may be conveniently secured to conventional combines and which will permit operation of the combine cutter bar in close proximity to the ground for harvesting relatively short crops or in a raised position for harvesting relatively tall crops.

Another object of the invention is the provision of an attachment for combines which will facilitate harvesting of fallen over or beaten down plants, which attachment may be applied to convention combines and which will cooperate with the parts of such combines in order to maintain sufficient strength and rigidity to operate for long periods of time without the necessity for repairs.

Further objects and advantages of the invention will be apparent from the following description taken in conjunction with the accompanying drawing wherein:

Fig. 1 is a side elevational view of the forward end portion of a conventional combine and showing the attachment of this invention applied thereto in place of the conventional combine reel;

Fig. 2 a top plan view of the structure shown in Fig. 1 with parts broken away for greater clarity;

Fig. 3 a side elevational view to an enlarged scale and showing the attachment of this invention and the manner of securing the same to the cutter bar of a conventional combine;

Fig. 4 an enlarged sectional view taken substantially on the line 4—4 of Fig. 3 and showing the drive mechanism for the attachment of this invention;

Fig. 5 a sectional view taken substantially on the line 5—5 of Fig. 3 and showing the manner of securing the attachment of this invention to the cutter bar of a combine;

Fig. 6 a fragmentary sectional view taken substantially on the line 6—6 of Fig. 4;

Fig. 7 a fragmentary sectional view taken substantially on the line 7—7 of Fig. 3; and Fig. 8 a view in perspective showing a fitting constituting the improvement and which permits securing the attachment of this invention to the upper side of the combine cutter bar.

With continued reference to the drawing there is shown the plant receiving apron 10 of a conventional combine, which apron may well comprise spaced substantially parallel sidewalls 11 and 12 between which is disposed a conveyor 13 which serves to carry the cut plants into the combine for further treatment.

Disposed transversely of the combine and below the forward edge of the apron 10 is a cutter bar 14 which is of the usual sickle bar type. The cutter bar 14 may be supported from the apron 10 by a bracket 15 and by other means to be presently described.

Secured to the upper side of the cutter bar 14 is a fitting 16 which, as best shown in Fig. 8, may well comprise an elongated base bar 17 provided with apertures 18 for receiving fastening means to secure the same to the cutter bar 14 and extending upwardly and forwardly from the base bar 17 and integral therewith are a pair of flanges 19 and 20. Flanges 19 and 20 are spaced to provide a central opening 21, the purpose of which will be later described. The upper edges of the flanges 19 and 20 are provided with elongated enlarged portions 22 and 23 which are provided with bores 24 and 25 extending therethrough.

In accordance with the present invention, there are provided one or more fallen plant pick-up units indicated generally at 26 and while two such units are shown in the drawings, it is to be understood, that any desired number of such units may be employed, depending upon the size of the particular combine to which the attachment of this invention is to be applied. Each pick-up unit 26 comprises a pair of opposed plant pick-up and conveyor sections 27 and 28 and each of these sections may well comprise upper and lower substantially parallel plates 29 and 30 which extend forwardly and downwardly with relation to the combine and such plates 29 and 30 provide a frame which is secured to a longitudinally extending arm 31, it being understood, that an arm 31 is provided for each of the elements 27 and 28. As best shown in Figs. 3 and 5, the arms 31 are pivotally mounted adjacent their rear ends by pivot pins 32 extending therethrough and through the bores 24 and 25 in the enlarged portions 22 and 23 of the flanges 19 and 20. As a result, it will be seen that the arms 31, as well as the pick-up elements 27 and 28 carried thereby are mounted for vertical swinging movement on the fitting 16 which in turn is secured to the upper side of the cutter bar 14. Mounted on the forward end of the upper plate 29 of each of the pick-up elements 27 and 28, is a ground engaging shoe 33 having a curved ground engaging lower surface 34. Pivotally mounted on each ground engaging shoe 33 for vertical swinging movement is a plant pick-up element 35 which is provided with an upwardly curved forward nose portion 36. Each pick-up element 35 is pivotally mounted by a pivot pin 37 extending through the element 35 and the ground engaging shoe 33 and also provided on the ground engaging shoe 33 is an adjusting screw 38 for adjusting the height of the pick-up element 35 with relation to the surface of the ground. It will also be noted, that the ground engaging shoe 33 is secured to the forward end of the arm 31 by suitable fastening means 39.

Mounted on the arms 31 adjacent the rear ends thereof is an upwardly extending frame comprising side members 40 and 41 and an upper cross member 42. Vertically disposed shafts 43 and 44 are journalled in bearings 45 and 46 carried by the cross member 42 and the shafts 43 and 44 also extend downwardly through the upper and lower plates 29 and 30 of the plant pick-up elements 27 and 28 respectively. Fixed to the shaft 43 below the upper plate 29 is a pulley 47 and in spaced relation thereto, but above the lower plate 30 is fixed another pulley 48. A pulley 49 is rotatably mounted on an axle 50 extending through the upper plate 29 and a bracket 51 extending rearwardly from the ground engaging shoe 33 and substantially midway between the pulleys 47 and 49 is an idler pulley 52 rotatably mounted on an axle 53 carried by the upper plate 29. A conveyor belt 54 is trained around the pulleys 47 and 49, as well as around the idler pulleys 52 and the belt 54 is provided with outwardly extending lugs 55, the purpose of which will be later described. A pulley 56 is rotatably mounted on an axle 57 carried by the lower plate 30 adjacent the forward end thereof and a conveyor belt 58 is trained around the pulleys 48 and 56 and the conveyor belt 58 is likewise provided with outwardly extending lugs 59. The arrangement of the conveyor belts has been described in connection with the pick-up element 27, but it is to be understood, that a similar arrangement is also utilized on the opposite pick-up element 28 and on all other pick-up elements incorporated in the apparatus.

Depending upwardly from the cross member 42 of the vertical frame are brackets 60 and 61 and these brackets serve to mount bearings 62 and 63 respectively in which are journalled a cross shaft 64 which replaces the conventional reel shaft found on combines of the type to which the attachment of this invention is to be applied. Fixed to the upper ends of the vertical shafts 43 and 44 are bevel gears 65 and 66 respectively and these gears mesh with bevel gears 67 and 68 respectively fixed to the cross shaft 64. The cross shaft 64 is provided adjacent one end thereof, with a pulley 69 which may be driven by a belt 70 from the combine power plant. As will be seen, rotation of the shaft 64 will serve to drive the vertical shafts 43 and 44, as a result of which the conveyor belts 47 and 48 will be driven during the operation of the apparatus.

The plant pick-up elements 27 and 28 may be provided with downwardly extending guard plates 71 and 72 which serve to prevent displacement of plants passing between the elements 27 and 28 and there may also be provided outwardly flared and curved guide plates 73 and 74 mounted adjacent the rear ends of the pick-up elements 27 and 28, in order to guide and direct plants to the conveyor 13 of the combine.

As will be seen from the above, the pick-up elements 27 and 28 mounted on the arms 31 are pivotally carried by the fitting 16 and in order to adjust the angular position of the pick-up elements 27 and 28 with respect to the remainder of the combine, there is provided rearwardly extending side bars 75 and 76 which are pivotally connected at their rear ends 77 and 78 respectively, with the side plates 11 and 12 of the apron 10 and the forward ends 79 and 80 of the side bars 75 and 76 respectively, rotatably receive the cross shaft 64. Pivotally mounted on the side plates 11 and 12 of the apron 10 are upwardly and rearwardly extending brace members 81 and 82 respectively, which are provided at their upper ends with fastening means 83 and 84 respectively, which may be selectively received in apertures 85 provided in the side bars 75 and 76. As will be seen from an inspection of Fig. 1, selective positioning of the fastening means 83 and 84 in the apertures 85 will result in raising or lowering the side bars 75 and 76 which in turn will pivotally move the plant pick-up elements 27 and 28 about the pivot pins 32 securing the arms 31 to the fitting 16. This will result in positioning the ground engaging shoes 33 at any desired distance above the ground.

In operation, as the combine moves forwardly standing plants will move between the pick-up elements 27 and 28 and will engage the cutter bar 14 to be cut thereby and moved rearwardly onto the conveyor 13 of the combine. However, plants which have fallen over or have been beaten down by the rain would commonly pass beneath the cutter bar 14 and would consequently be lost. With the present attachment, the fallen plants are first engaged by the nose portions 36 of the pick-up elements 35 which serves to raise such fallen plants, whereupon the same will pass between the pick-up elements 27 and 28 and be engaged by the lugs 55 and 59 on the upper and lower conveyor belts 47 and 48 which will serve to further raise the fallen plants to upright position and will convey the same rearwardly between the pick-up elements 27 and 28 and into engagement with the cutter bar 14 to be cut thereby. The cut plants will then, of course, pass rearwardly onto the conveyor 13 and into the combine for further treatment. In order to insure that the plants passing between the pick-up elements 27 and 28 will engage the lugs 55 and 59 on the conveyor belts 47 and 48, there has been provided a rearwardly extending resilient arm 86, which as shown in Fig. 2, will engage the plants passing between the pick-up elements 27 and 28 and will urge the same into engagement with the lugs 55 and 59 on the conveyor belts 47 and 48 of the pick-up element 28.

As will be seen, the fitting 16 is mounted on the upper side of the cutter bar 14 and will, therefore, permit adjustment of the cutter bar 14 to a position in close proximity to the surface of the earth and since, the lower side of the cutter bar 14 is relatively smooth, the same may pass freely over the ground without accumulate sticks, stones or other debris and the cut plants may pass freely over the cutter bar 14 and through the space 21 between the flanges 19 and 20 of the fitting 16. This will permit the harvesting of relatively low crops, whereas with the structure described and claimed in my previous patent, mentioned above, the apparatus was only usable with relatively tall crops, since, the fitting utilized in the structure of that patent extended below the cutter bar 14 and prevented adjusting the same into close proximity with the ground. Furthermore, frequent cleaning of the same was necessary, due to the collection of debris by the fitting and, as explained above, this collection is avoided by the structure of this invention.

With the exception of the particular fitting employed and the manner of installation thereof, the structure of this invention is substantially the same as that disclosed and claimed in my prior patent, but, as mentioned above, this invention represents a material improvement thereover and results in an apparatus which is far more flexible in use and, therefore, of greater utility.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A plant pick-up attachment for combines including a cutter bar and a conveyor behind said cutter bar, said pickup attachment comprising a fitting including an elongated base bar secured to the upper side of said cutter bar, a pair of spaced forwardly and upwardly extending flanges integral with said base bar, an elongated enlarged portion on the upper edge of each flange, each enlarged portion having a longitudinal bore extending therethrough, a pair of elongated arms extending forwardly of said cutter bar, a pair of pivot pins extending through said arms and said bores to pivotally mount said arms for vertical swinging movement on said fitting, a pair of forwardly extending tapered pick-up units, one of said units being supported on each of said arms, a ground engaging shoe at the forward end of each of said units, a pick-up element pivotally mounted on each of said shoes for vertical swinging movement and extending forwardly therefrom, means for adjusting the height of each pick-up element relative to the ground, an endless belt carried by each of said units and having laterally directing lugs projecting from the outer sides thereof, said units diverging forwardly to permit entry of plants therebetween, an upwardly extending frame mounted on said arms, brackets mounted on the upper portion of said frame, bearings carried by said brackets, a shaft journalled in said bearings, drive means connecting said shaft and each of said belts and means for driving said shaft.

2. A plant pick-up attachment for combines including a cutter bar and a conveyor behind said cutter bar, said pick-up attachment comprising a fitting including an elongated base bar secured to the upper side of said cutter bar, a pair of spaced forwardly and upwardly extending flanges on said base bar, an elongated enlarged portion on the upper edge of each flange, each enlarged portion having a longitudinal bore extending therethrough, a pair of elongated arms extending forwardly of said cutter bar, a pair of pivot pins extending through said arms and said bores to pivotally mount said arms for vertical swinging movement on said fitting, a pair of forwardly extending tapered pick-up units, one of said units being supported on each of said arms, a ground engaging shoe at the forward end of each of said units, a pick-up element pivotally mounted on each of said shoes for vertical swinging movement and extending forwardly therefrom, means for adjusting the height of each pick-up element relative to the ground, and endless belt carried by each of said units and having laterally directed lugs projecting from the outer sides thereof, said units diverging forwardly to permit entry of plants therebetween, an upwardly extending frame mounted on said arms, brackets mounted on the upper portion of said frame, bearings carried by said brackets, a shaft journalled in said bearings, drive means connecting said shaft and each of said belts and means for driving said shaft.

3. A plant pick-up attachment for combines including a cutter bar and a conveyor behind said cutter bar, said pick-up attachment comprising a fitting including an elongated base bar secured to the upper side of said cutter bar, a pair of spaced forwardly and upwardly extending flanges on said base bar, each flange having a longitudinal bore, a pair of elongated arms extending forwardly of said cutter bar, a pair of pivot pins on said arms extending into said bores to pivotally mount said arms for vertical swinging movement on said fitting, a pair of forwardly extending tapered pick-up units, one of said units being supported on each of said arms, a ground engaging shoe at the forward end of each of said units, a pick-up element pivotally mounted on each of said shoes for vertical swinging movement and extending forwardly therefrom, means for adjusting the height of each pick-up element relative to the ground, an endless belt carried by each of said units and having laterally directed lugs projecting from the outer sides thereof, said units diverging forwardly to permit entry of plants therebetween, an upwardly extending frame mounted on said arms, brackets mounted on the upper portion of said frame, bearings carried by said brackets, a shaft journalled in said bearings, drive means connecting said shaft and each of said belts and means for driving said shaft.

References Cited in the file of this patent

UNITED STATES PATENTS

| | | |
|---|---|---|
| 1,390,159 | Price | Sept. 6, 1921 |
| 2,552,623 | Dye | May 15, 1951 |
| 2,702,980 | Pitner | Mar. 1, 1955 |
| 2,737,770 | Wigham | Mar. 13, 1956 |